(12) United States Patent
Luise et al.

(10) Patent No.: US 10,177,630 B2
(45) Date of Patent: Jan. 8, 2019

(54) INDUCTION MOTORS

(71) Applicant: Nidec ASI S.p.A., Milan (IT)

(72) Inventors: Fabio Luise, Venice (IT); Stefano Pieri, Ronchi dei Legionari (IT); Maurizio Scalabrin, San Cranzian D'Isonzo (IT)

(73) Assignee: Nidec ASI S.p.A., Milan (IT)

( * ) Notice: Subject to any disclaimer, the term of this patent is extended or adjusted under 35 U.S.C. 154(b) by 278 days.

(21) Appl. No.: 15/300,955

(22) PCT Filed: Mar. 19, 2015

(86) PCT No.: PCT/EP2015/055840
§ 371 (c)(1),
(2) Date: Sep. 30, 2016

(87) PCT Pub. No.: WO2015/150100
PCT Pub. Date: Oct. 8, 2015

(65) Prior Publication Data
US 2017/0025928 A1      Jan. 26, 2017

(30) Foreign Application Priority Data

Apr. 4, 2014   (EP) .................................... 14163634

(51) Int. Cl.
| | |
|---|---|
| *H02K 9/00* | (2006.01) |
| *H02K 9/16* | (2006.01) |
| *H02K 5/18* | (2006.01) |
| *H02K 5/20* | (2006.01) |
| *H02K 9/06* | (2006.01) |
| *H02K 9/14* | (2006.01) |

(52) U.S. Cl.
CPC ................. *H02K 9/16* (2013.01); *H02K 5/18* (2013.01); *H02K 5/20* (2013.01); *H02K 9/06* (2013.01); *H02K 9/14* (2013.01)

(58) Field of Classification Search
CPC ............................................... H02K 9/00–9/06
USPC ............................................................ 310/59
See application file for complete search history.

(56) References Cited

U.S. PATENT DOCUMENTS

| | | | | | |
|---|---|---|---|---|---|
| 3,250,926 | A | * | 5/1966 | O'Reilly .................. | H02K 9/06 310/59 |
| 3,383,529 | A | * | 5/1968 | Baumann ................. | H02K 9/06 310/52 |

(Continued)

FOREIGN PATENT DOCUMENTS

| | | |
|---|---|---|
| EP | 1976098 A2 | 10/2008 |
| JP | S5562160 U | 4/1980 |

OTHER PUBLICATIONS

International Search Report and Written Opinion dated Jul. 14, 2015 from International Application No. PCT/EP2015/055840, pp. 1-9.

*Primary Examiner* — Alexander Talpalatski
(74) *Attorney, Agent, or Firm* — MH2 Technology Law Group LLP

(57) ABSTRACT

An induction motor may include a housing, a stator, a rotor, and/or cooling fins on an outside surface of the housing. The rotor may include inner air ducts configured to allow passage of airflow therethrough. The motor may include outer air ducts in fluid communication with the inner air ducts to form an air-circulation circuit. The outer air ducts may be arranged radially outside the cooling fins.

11 Claims, 7 Drawing Sheets

(56) References Cited

U.S. PATENT DOCUMENTS

| | | | | |
|---|---|---|---|---|
| 3,497,737 | A | * | 2/1970 | Philofsky ................ H02K 3/22 |
| | | | | 285/48 |
| 3,610,975 | A | | 10/1971 | Onjanow |
| 3,800,173 | A | * | 3/1974 | Rosenberry, Jr. ........ H02K 9/06 |
| | | | | 310/59 |
| 6,987,337 | B2 | * | 1/2006 | Lowther ................ H02K 9/10 |
| | | | | 310/54 |
| 7,902,699 | B2 | * | 3/2011 | Pellegrino ................ H02K 1/32 |
| | | | | 310/52 |
| 2011/0068644 | A1 | | 3/2011 | Kamp |
| 2014/0021812 | A1 | | 1/2014 | Hashish |
| 2014/0062227 | A1 | | 3/2014 | Lang et al. |
| 2014/0117797 | A1 | * | 5/2014 | Grillenberger .......... H02K 1/20 |
| | | | | 310/54 |

\* cited by examiner

INDUCTION MOTORS

CROSS-REFERENCE TO RELATED APPLICATION(S)

This application is a national stage entry from International Application No. PCT(EP2015/055840, filed on Mar. 19, 2015, in the Receiving Office ("RO/EP") of the European Patent Office ("EPO") and published as International Publication No. WO 2015/150100 A1 on Oct. 8, 2015, which claims priority from European Patent Application No. 14163634.0 filed on Apr. 4, 2014, the entire contents of all of which are incorporated herein by reference.

FIELD OF THE INVENTION

The present invention relates to the field of induction motor cooling systems.

BACKGROUND OF THE INVENTION

An induction motor comprises a stator which generates a revolving magnetic field inside a cavity and a rotor which is rotatably arranged inside the cavity of the stator and rotates by interaction with the magnetic field generated by the stator.

The stator comprises a stator stack defining the cavity and a stator winding which is wound on the inner peripheral portion of the stator stack. When a current flows through the stator winding, a magnetic field is generated inside the cavity.

The rotor comprises a rotor stack and a rotor cage with a rotary shaft. The rotor cage is formed by a pair of end rings and a plurality of conductive bars formed between the pair of end rings.

When the rotor is rotatably disposed inside the cavity of the stator and a current flows through the stator winding, the magnetic field generated by the stator winding is applied to the rotor. This in turns generates a current in the conductive bars and an electromagnetic force is generated in the rotor due to the interaction between the current generated in the conductive bars and the magnetic field generated by the stator. The rotor rotates due to the electromagnetic force generated in the rotor.

In the magnetic and the electric circuits of the motor (stator and rotor stacks, stator winding and rotor cage) power losses are present due to the electromagnetic power conversion. These losses generate heat which has to be removed to maintain the temperature of the components compatible with the materials thermal class properties and the desired level of reliability of the motor.

In order to remove the generated heat, the motor is provided with an air circulation cooling system.

In the state of the art, it is known to provide fins on the outer surface of the housing of the motor and a fan assembly on the non-drive side of the motor to generate and direct an airflow toward the fins.

For example, induction motors with cooling systems are disclosed in US 2014/0062227, US 2014/0021812 and US 2011/0068644.

Since a relevant amount of losses is caused by the heat generated in the rotor, the Applicant has perceived that the cooling fins are just about sufficient to remove the heat generated in the rotor, and that the motor performance can be increased by improving the rotor cooling.

Therefore, a need arises to provide an induction motor with a cooling system involving improved cooling of the rotor.

SUMMARY OF THE INVENTION

The present invention relates to an induction motor comprising a housing having an outer surface, a stator retained within said housing, said stator having a stator cavity extending along a longitudinal direction, a rotor rotatably arranged within said stator cavity of said stator and configured to rotate relative to said stator around an axis extending along said longitudinal direction, a plurality of circumferentially spaced cooling fins arranged on said outer surface of the housing, each cooling fin extending along said longitudinal direction and projecting outwardly from said outer surface between a base portion located on said outer surface and a free end located at a fin distance, said fin distance being measured as radial distance between said axis and said free end, said rotor comprises a plurality of inner air ducts, each inner air duct being configured to allow passage of an airflow therethrough, said induction motor comprises a plurality of outer air ducts in fluid communication with said plurality of inner air ducts to form an air circulation circuit, each outer air duct is arranged adjacent to respective one or more cooling fins and is spaced apart and separated from said respective one or more cooling fins, each outer air duct extends along said longitudinal direction, in parallel to the respective one or more cooling fins, between a first end portion and second end portion, each outer air duct is arranged outside said adjacent one or more cooling fins and exhibits a minimum duct distance measured as the minimum radial distance between said axis and said outer air duct, said minimum duct distance being greater than the maximum fin distance of the respective adjacent one or more cooling fins.

Preferably, each outer air duct is arranged radially outside the free end of a respective adjacent cooling fin and extends in parallel to said adjacent cooling fin, said minimum duct distance being greater than the fin distance of said adjacent cooling fin.

Preferably, said housing comprises a plurality of first holes and a plurality of second holes formed in said outer surface, a plurality of first outer connection ducts and a plurality of second outer connection ducts are provided for connecting the first end portion of each outer air duct with a corresponding first hole and for connecting the second end portion of each outer air duct with a corresponding second hole.

Preferably, said housing extends between a drive side and a fan side, at said fan side a fan cooling assembly is arranged, said fan cooling assembly comprises an inner fan and an outer fan, said inner fan is configured to generate an airflow flowing through said plurality of inner air ducts and said plurality of outer air ducts, said outer fan is configured to generate and direct an airflow towards said plurality of cooling fins arranged on the outer surface of the housing and towards said plurality of outer air ducts.

Preferably, said inner fan comprises an inlet for sucking air and an outlet for discharging air, said outlet of the inner fan is positioned in proximity of one of said first and second holes.

Preferably, an inner air guide is positioned between the plurality of inner air ducts and the inner fan to collect and guide the air exiting the inner air ducts towards the inner fan, an inner air guide is positioned between the plurality of inner air ducts and the first holes to collect the air exiting first holes and guide it towards said plurality of inner air ducts.

Preferably, a casing is arranged outside the plurality of cooling fins and said plurality of outer air ducts so that the cooling fins and the outer air ducts are enclosed between the outer surface of the housing and the casing.

Preferably, said rotor is coupled with a drive shaft, said plurality of inner air ducts comprises one or more groups of circumferentially spaced inner air ducts, at least one group of circumferentially spaced inner air ducts is formed in said rotor at a radial position close to said drive shaft.

Preferably, said rotor comprises a rotor stack coupled with said drive shaft and a rotor cage coupled with said rotor stack, said at least one group of circumferentially spaced inner air ducts formed in said rotor at a radial position close to said drive shaft is formed in said rotor stack.

BRIEF DESCRIPTION OF THE DRAWINGS

The present invention will now be described in more detail hereinafter with reference to the accompanying drawings, in which some embodiments of the invention are shown. Drawings illustrating the embodiments are schematic representations.

DETAILED DESCRIPTION

Figure 1:
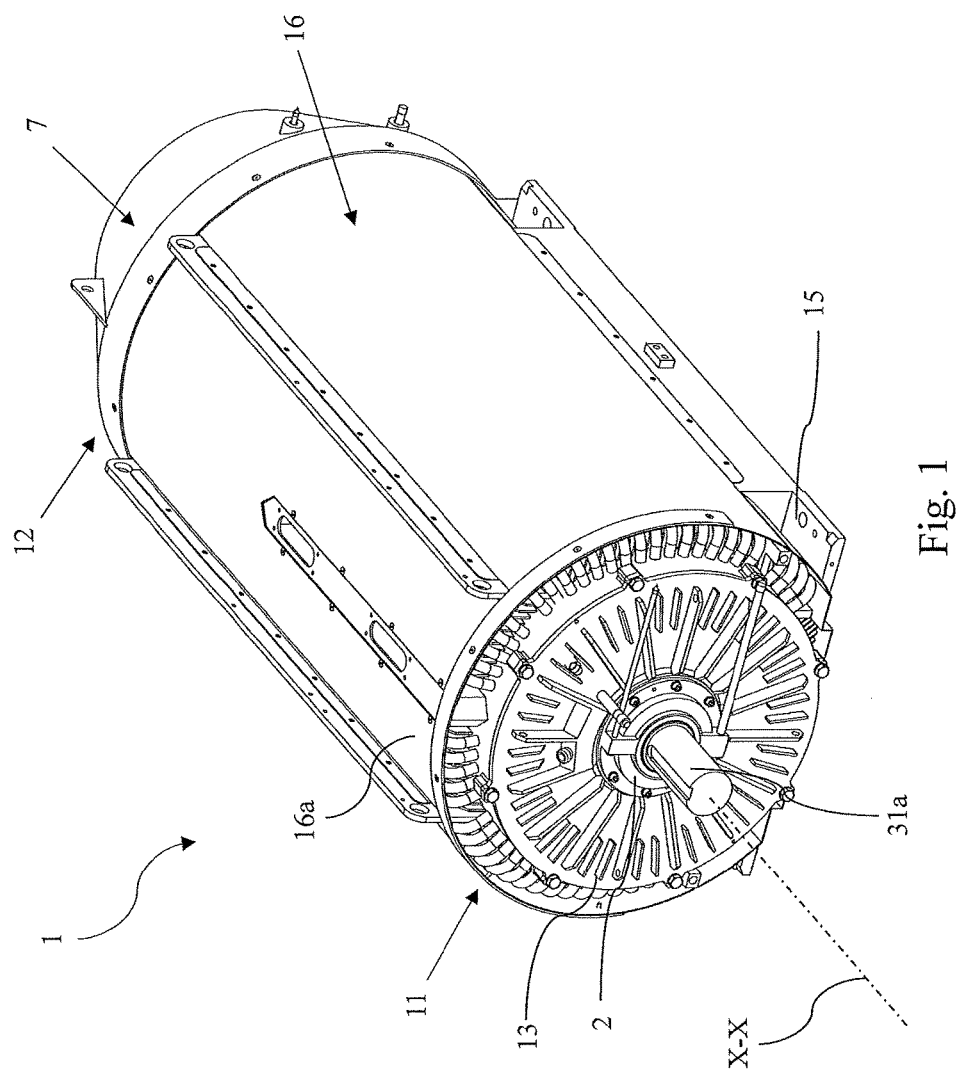
FIG. 1 is a perspective view of an induction motor according to one embodiment of the present invention.
Figure 2:
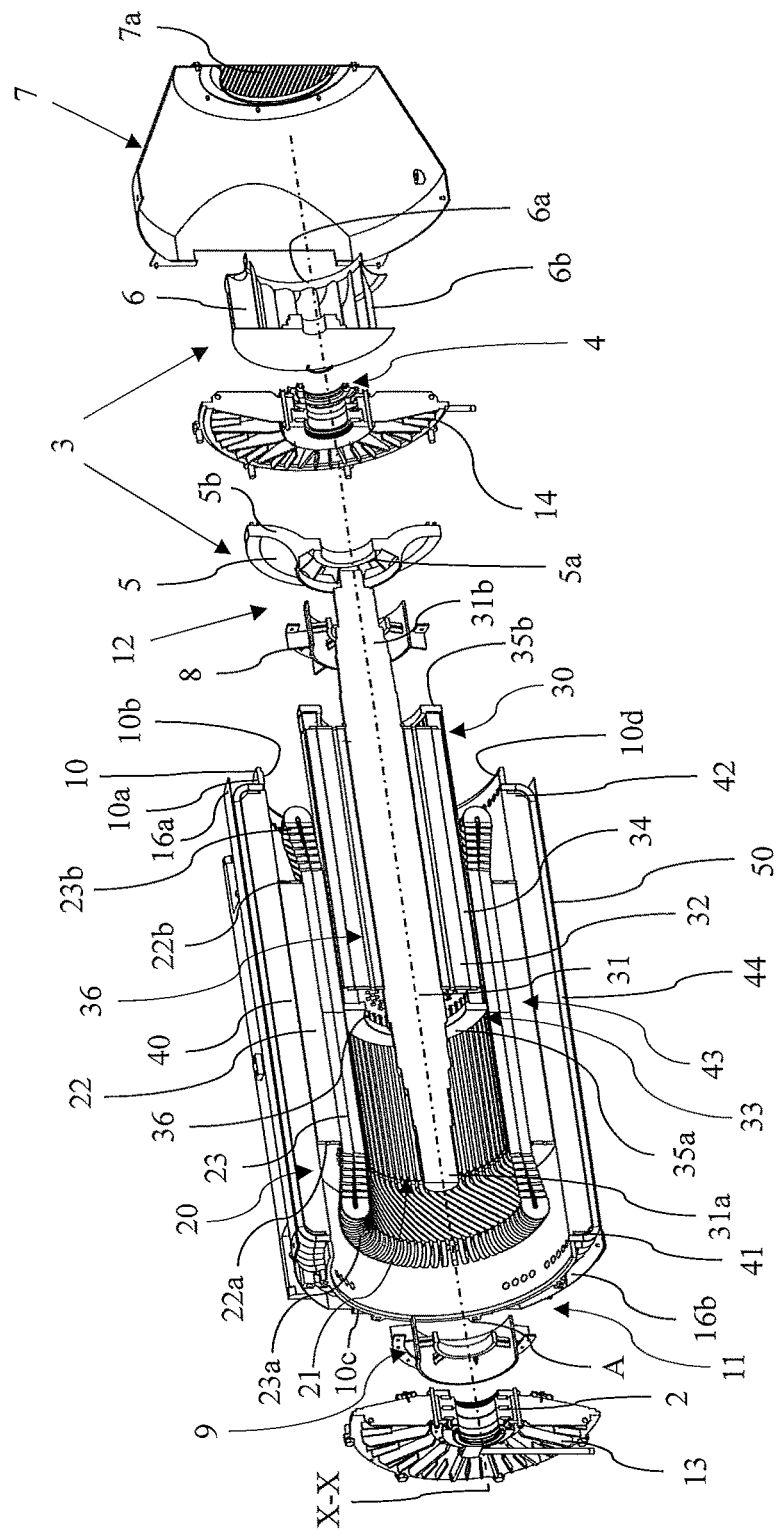
FIG. 2 is a section view of the motor of FIG. 1.
Figure 3:
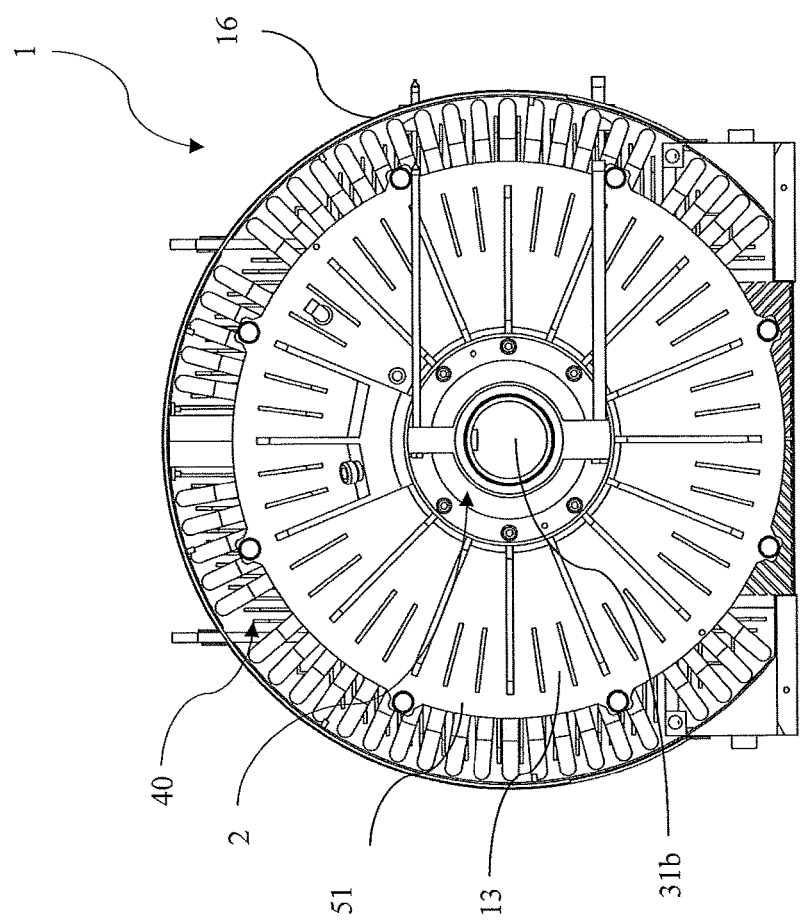
FIG. 3 is front view of the motor of FIG. 1, FIGS. 4-7 are further section views of the motor of FIG. 1.
Figure 4:
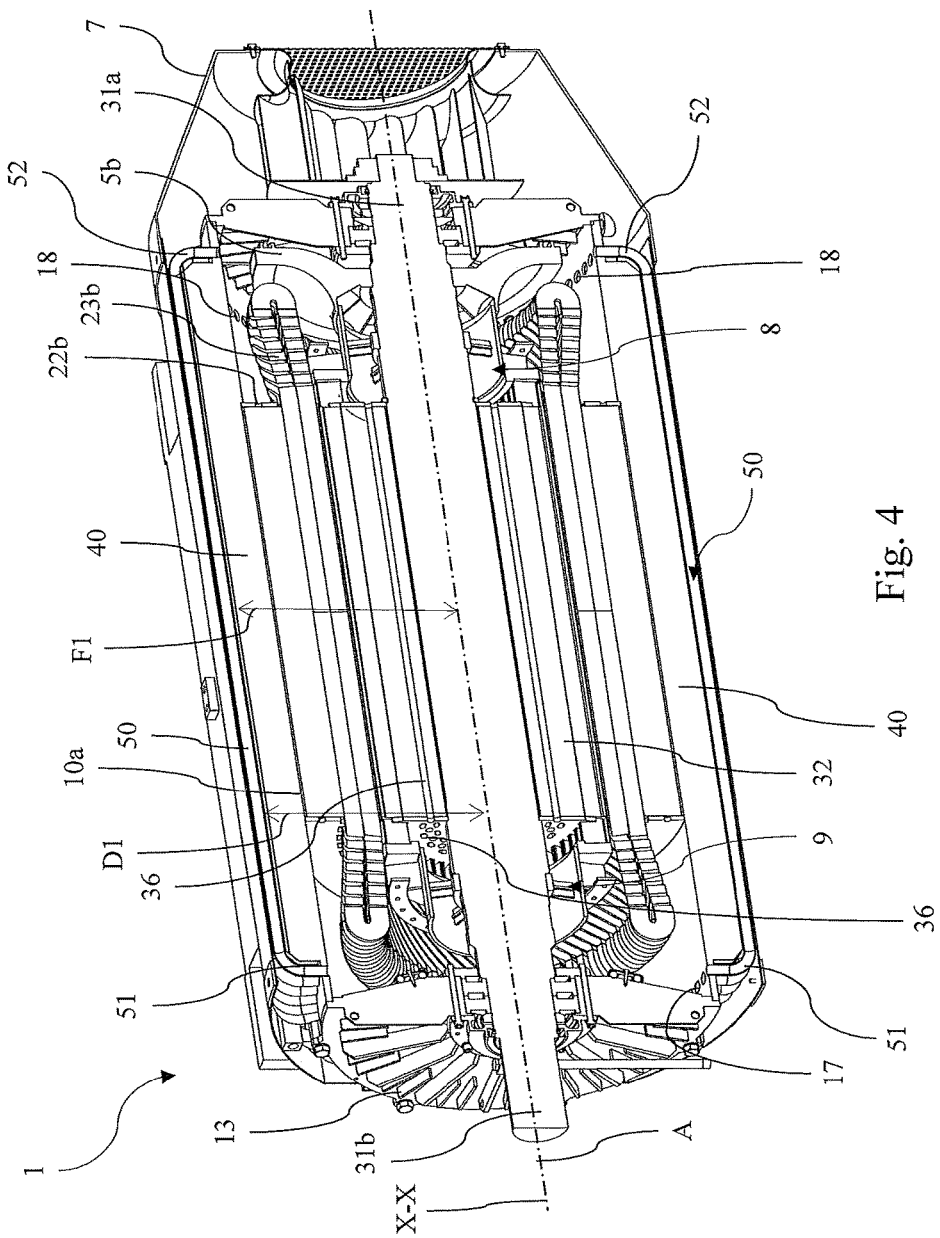
Figure 5:
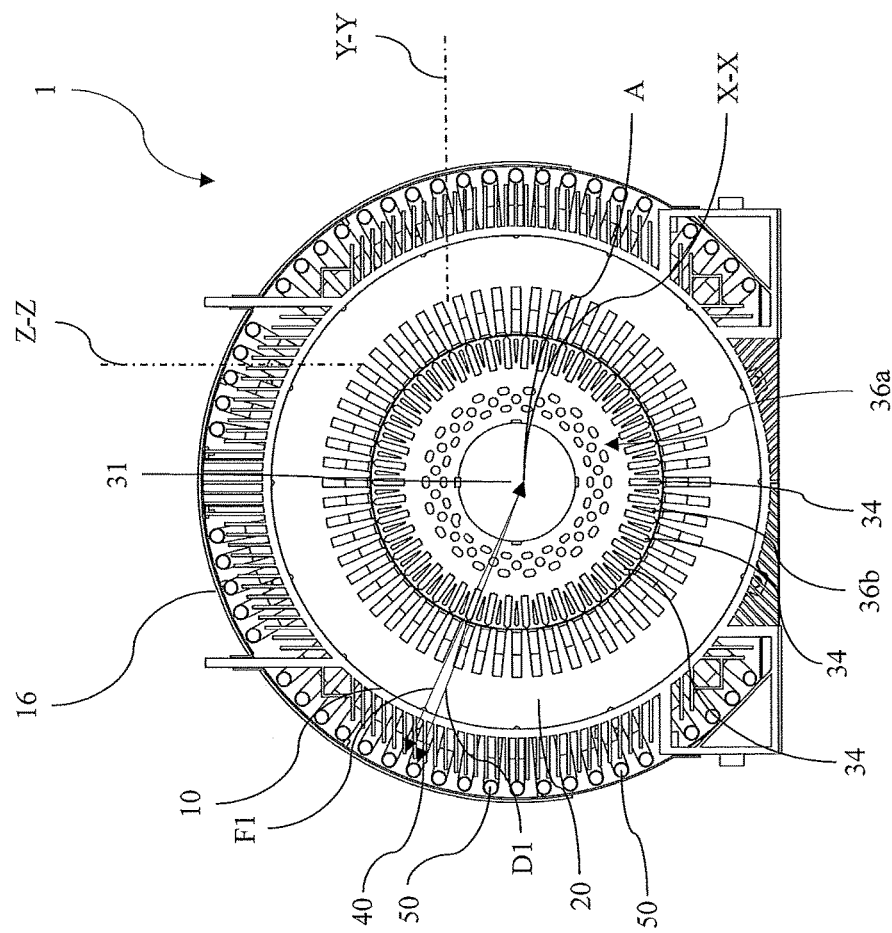
Figure 6:
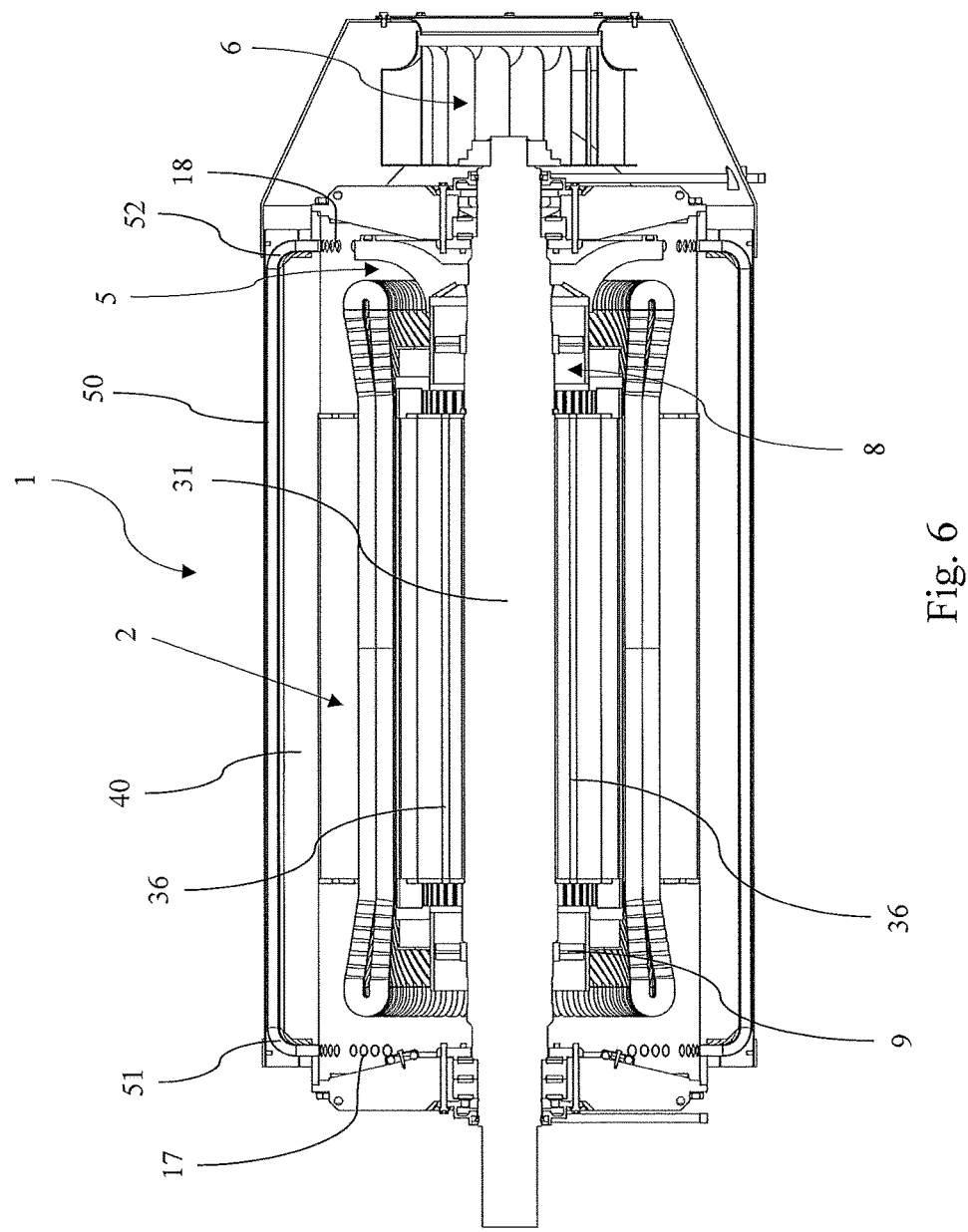
Figure 7:
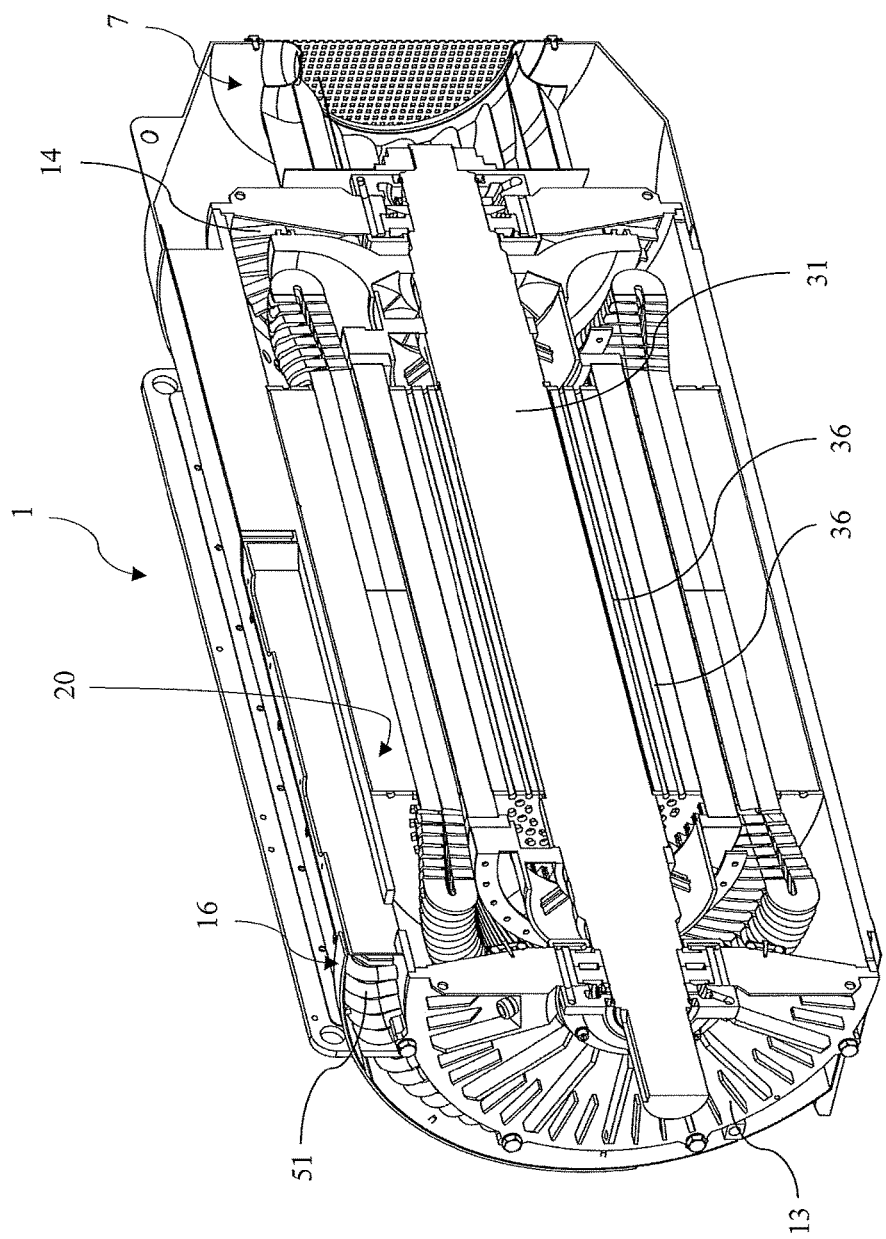

FIG. 1 shows an induction motor 1.

According to a preferred embodiment, the induction motor 1 is a totally enclosed fan cooled (TEFC) induction motor.

The induction motor 1 comprises a housing 10 and a stator 20 retained within the housing 10. The housing 10 has an outer surface 10a and an inner surface 10b.

Preferably, the housing 10 comprises a plurality of supporting members 15, in the example in the form of feet, for leaning on a base floor.

The stator 20 has a stator cavity 21 extending along a longitudinal direction X-X along which extends the axis A of the induction motor 1.

The stator 20 comprises a stator stack 22 extending along the longitudinal direction X-X from a first end 22a and a second end 22b and a stator winding 23 coupled with the stator stack 22 and extending along the longitudinal direction X-X from a first end portion 23a and a second end portion 23b. The stator winding 23 protrudes longitudinally from the first and second ends 22a, 22b of the stator stack 22. In particular, the first end portion 23a and the second end portion 23b of the stator winding 23 protrude from the first and second ends 22a, 22b of the stator stack 22.

The rotor 30 is rotatably arranged within the stator 20, in particular within the stator cavity 21, and is configured to rotate relative to the stator 20 around the axis A. The rotor 30 comprises a drive shaft 31 extending along the longitudinal direction X-X between a first end portion 31a and a second end portion 31b. The first end portion 31a identifies the driving connection of the induction motor 1.

According to one embodiment, the rotor 30 comprises a rotor stack 32 coupled with the drive shaft 31 and a rotor cage 33 coupled with the rotor stack 32. The rotor cage 33 comprises a plurality of circumferentially spaced bars 34 and two opposite rings 35a, 35b coupled with the plurality of circumferentially spaced bars 34. The bars 34 and the rings 35a, 35b are made of electrically conductive material.

The housing 10 extends longitudinally between a first end portion 10c and a second end portion 10d. The first end portion 10c identifies a drive side 11 and the second end portion 10d identifies a fan side 12.

At the drive side 11, a drive bearing assembly 2 is arranged. The drive bearing assembly 2 is supported by a first shield 13 fixed to and retained by the housing 10. The drive bearing assembly 2 is coupled with the first end portion 31a of the drive shaft 31 to support the rotation and the driving function of the drive shaft 31.

At the fan side 12, a fan cooling assembly 3 and a non-drive bearing assembly 4 are arranged. The non-drive bearing assembly 4 is supported by a second shield 14 fixed to and retained by the housing 10. The non-drive bearing assembly 4 is coupled with the second end portion 31b of the drive shaft 31 and cooperates with the drive bearing assembly 2 to support the rotation of the drive shaft 31.

The fan cooling assembly 3 comprises an inner fan 5 and an outer fan 6.

The inner fan 5 is positioned inside the housing 10, between the rotor 30 and the second shield 14 and is configured to generate an airflow for cooling the rotor 30 and, preferably, a portion of the stator 20. In particular, the inner fan 5 comprises an inlet 5a for sucking air and an outlet 5b for discharging air.

The outer fan 6 is positioned outside the housing 10, beyond the second shield 14 and is configured to generate an airflow on the outer surface 10a of the housing 10. In particular, the outer fan 6 comprises an inlet 6a for sucking air and an outlet 6b for discharging air.

In particular on the outer surface 10a of the housing 10, a plurality of circumferentially spaced cooling fins 40 is arranged. Preferably the cooling fins 40 comprise a plurality of groups of cooling fins, where the cooling fins of each group are parallel with each other. Each cooling fin 40 extends along the longitudinal direction X-X and projects outwardly from the outer surface 10a between a base portion 43 located on the outer surface 10a, and a free end 44 located at a fin distance F1. The fin distance F1 is measured as radial distance between the axis A and the free end 44. In other words, the fin distance F1 is measured on a cross-section plane Y-Z (i.e., a plane perpendicular to the axis A and to the longitudinal direction X-X) as the linear distance between the axis A and the free end 44. The fin distance F1 may be constant or may vary longitudinally between the first end portion 41 and the second end portion 42. In the example, each group of parallel cooling fins extends outwardly along a respective transversal direction, for example the direction Y-Y or the direction Z-Z, perpendicularly to the longitudinal direction X-X. The transversal directions Y-Y and Z-Z lie on a plane perpendicular to the longitudinal direction X-X.

Preferably, the first end portion 41 and the second end portion 42 of the cooling fins 40 are in proximity of the first end portion 10c and the second end portion 10d of the housing 10 respectively. By this way, the cooling fins 40 exploit substantially the entire effective outer surface 10a of the housing 10.

The airflow generated by the outer fan 6 is directed towards the cooling fins 40 to remove, by heat exchange with the air outside the housing 10, the heat generated within the housing 10, in particular by the stator 20.

The inner fan 5 is coupled with the second end portion 31b of the drive shaft 31 and thereby is driven by the drive shaft 31. In particular, the inner fan 5 is fitted on the second end portion 31b of the drive shaft 31 and rotates jointly with the drive shaft 31.

According to one embodiment, the outer fan 6 is also coupled with the second end portion 31b of the drive shaft 31. In particular, the outer fan 5 is also fitted on the second end portion 31b of the drive shaft and rotates jointly with the drive shaft 31.

According to an alternative embodiment, the outer fan 6 may be coupled to the drive shaft of an electric motor provided to this purpose. This embodiment is advantageous when the induction motor 1 is a low or variable speed motor. In this case, in fact, the low or variable speed of the drive shaft 31 may not guarantee a sufficient rate of the airflow of the outer fan 6.

A fan cover 7 is fastened to the housing 10 to cover the outer fan 6. The fan cover 7 has a plurality of holes 7a for allowing the outer fan 6 to suck air and generate an airflow directed on the outer surface 10a of the housing 10. On the outer surface 10a of the housing 10, the airflow generated by the outer fan 6 exchanges heat with the fins 40 to remove heat from the housing 10.

In order to remove heat from the rotor, the rotor 30 comprises a plurality of inner air ducts 36. Preferably, the inner air ducts 36 are formed in the rotor stack 32. Each inner air duct 36 is configured to allow passage of an airflow therethrough.

According to one embodiment, the inner air ducts 36 comprises one or more groups of circumferentially spaced inner air ducts. The groups of inner air ducts are positioned at distinct radial positions.

Preferably, the inner air ducts 36 comprise a first group 36a of inner air ducts formed in the rotor stack 32. More preferably, the inner air ducts 36 comprise also a second group 36b of inner air ducts formed between two adjacent bars 34.

The first group 36a is positioned closer to the drive shaft 31 than the second group 36b. Each group of inner air ducts may comprise one or more arrays of circumferentially spaced inner air ducts, where the arrays are positioned at distinct radial positions.

For example, the first group 36a comprises three arrays of circumferentially spaced inner air ducts while the second group 36b comprise a single array of circumferentially spaced inner air ducts.

The inner air ducts of the first group 36a which are formed in the rotor stack 32 have annular cross section. The inner air ducts of the second group 36b which are formed between two adjacent bars 34 have an elongate cross section with short sides and long sides, where the long sides extends radially.

To form an air circulation circuit, a plurality of circumferentially spaced outer air ducts 50 is provided outside the housing 10. The outer air ducts 50 are in fluid communication with the inner air ducts 36.

The inner fan 5 is configured to generate an airflow flowing through the inner air ducts 36 and the outer air ducts 50.

According to one embodiment, the inner fan 5 sucks air through the inner air ducts 36 and discharge the sucked air in the outer air ducts 50. By this way, the sucked air collects part of the heat generated by the rotor 30 and then passes through the outer air ducts 50 to release this collected heat by heat-exchange with the air outside the housing 10.

According to an alternative embodiment, the inner fan 5 sucks air through the outer air ducts 50 and discharge the sucked air in the inner air ducts 36. By this way, the sucked air passes through the inner air ducts 36 where it collects part of the heat generated by the rotor 30 and then passes through the outer air ducts 50 to release this collected heat by heat-exchange with the air outside the housing 10.

Each outer air duct 50 is arranged adjacent to respective one or more cooling fins 40 and is spaced apart and separated from the respective one or more cooling fins 40.

Each outer air duct 50 extends along the longitudinal direction X-X, in parallel to the respective one or more cooling fins 40, between a first end portion 51 and second end portion 52.

Each outer air duct 50 is arranged outside the adjacent one or more cooling fins 40, and exhibits a minimum duct distance D1 measured as the minimum radial distance between the axis A and the outer air duct 50. In other words, the minimum duct distance D1 is measured on a cross-section plane Y-Z (i.e., a plane perpendicular to the axis A and to the longitudinal direction X-X) as the minimum linear distance between the axis A and the outer air duct 50. The minimum duct distance D1 is greater than the maximum fin distance F1 of the respective adjacent one or more cooling fins 40. In other words, the outer air ducts 50 are arranged radially outside the plurality of cooling fins 40.

According to one embodiment, the outer surface 10a of the housing 10 has a substantially cylindrical shape. The plurality of circumferentially spaced cooling fins 40 is arranged on the outer surface 10a of the housing 10 and projects outwards form the outer surface 10a. In particular, the plurality of cooling fins 40 extends outwards from the outer surface 10a developing inside an annular zone encircling and surrounding the outer surface. The annular zone extends along the longitudinal direction X-X and shows a substantially annular section, therefore encircling and surrounding the substantially cylindrical outer surface 10a. Furthermore, the outer air ducts 50 are arranged outside the annular zone with a substantially radial disposition. Moreover, the external border of the annular zone coincides locally with the free end 44 of each cooling fin 40 and is therefore located at the fin distance F1 from the axis A. As said above, the outer ducts are located outside the annular zone, thus at a minimum duct distance D1 which is locally greater than the maximum fin distance F1 of the adjacent one or more cooling fins 50. For example, the cooling fins 50 can comprise groups of cooling fins 50, each group of cooling fins 50 projects from the outer surface 10a with a different orientation and with a different fin distance F1. As said before, the minimum duct distance D1 of an outer air duct 50 is locally greater than the fin distance F1, and may vary "locally" depending on the maximum fin distance F1 of the adjacent group of cooling fins 40. Hence, each outer air duct 50 is spaced apart and separated from the adjacent (or nearest) group of cooling fins 40.

This arrangement of the outer air ducts 50 makes it possible to separate the heat dissipation airflow generated by the outer fan 6 and directed towards the cooling fins 40—which is devoted mainly to remove the heat generated by the stator 20—and the heat dissipation airflow generated by the inner fan 5 and flowing within the outer air ducts 50—which is devoted mainly to remove the heat generated by the rotor 30.

According to one embodiment, each outer air duct 50 is arranged radially outside the free end 44 of a respective adjacent cooling fin 40 and extends in parallel to the adjacent cooling fin 40. The minimum duct distance D1 being greater than the fin distance F1 of the adjacent cooling fin 40.

According to one embodiment, the induction motor 1 comprises a casing 16 arranged outside the cooling fins 40 and the outer air ducts 50. The cooling fins 40 and the outer air ducts 50 are thereby enclosed between the housing 10 and the casing 16. The casing 16 has an outer surface 16*a* and an inner surface 16*b*. With this embodiment, the airflow generated by the outer fan 6 is forced to flow between the outer surface 10*a* of the housing 10 and the inner surface 16*b* of the casing 16. In turn, this optimizes the airflow through the cooling fins 40 and the efficiency of the heat exchange of the cooling fins 40.

Preferably, a part of the airflow generated by the inner fan 5 flows towards the second end portions 23*b* of the stator winding 23 protruding from the stator stack 22. Thereby, this part of the airflow generated by the inner fan 5 collects the heat generated by the stator winding 23 and then flows through the outer air ducts 50 to release this heat.

Preferably, the first end portion 51 and the second end portion 52 of the outer air ducts 50 are in proximity of the first end portion 10*c* and the second end portion 10*d* of the housing 10.

The housing 10 comprises a plurality of first holes 17 and a plurality of second holes 18 formed in the outer surface 10*a*. A plurality of first outer connection ducts 53 and a plurality of second outer connection ducts 54 are provided for connecting the first end portion 51 of each outer air duct 50 with a corresponding first hole 17 and for connecting the second end portion 52 of each outer air duct 50 with a corresponding second hole 18.

Preferably, the first holes 17 and the second hole 18 are in proximity of the first end portion 10*c* and the second end portion 10*d* of the housing 10.

The inner fan 5 sucks hot air from the rotor inner ducts 36 and directs a hot airflow towards the second holes 18. Through the second holes 18, the hot airflow enters the outer air ducts 50 and exits at the first holes 17 with a lower temperature due the heat exchange performed during its travelling within the outer air ducts. The airflow exiting at the first holes is sucked by the inner fan 5 through the rotor inner ducts 36 and therefore enters into the rotor inner air ducts 36 to collect the heat generated by the rotor 30.

Preferably, the outlet 5*b* of the inner fan 5 is positioned in proximity of the second holes 18 to reduce flow losses between the outlet 5*b* of the inner fan 5 and the second holes 18.

Preferably, an inner air guide 8 is coupled with the second end portion 31*b* of the drive shaft 31 and is positioned between the inner air ducts 36 and the inner fan 5 to collect the air exiting the inner air ducts 36 and guide it towards the inner fan 5.

Preferably, an inner air guide 9 is coupled with the first end portion 31*a* of the drive shaft 31 and is positioned between the inner air ducts 36 and the first holes 17 to collect the air exiting the first holes 17 and guide it towards the inner air ducts 36.

The inner air guides 8, 9 rotate jointly with the drive shaft 31.

While the invention has been described with reference to preferred embodiments, the description is illustrative of the invention and is not to be construed as limiting the invention.

Various modifications and applications may occur to those skilled in the art without departing from the scope of the invention as defined by the appended claims.

The invention claimed is:

1. An induction motor, comprising:
a housing having an outer surface,
a stator retained within said housing, said stator having a stator cavity extending along a longitudinal direction,
a rotor rotatably arranged within said stator cavity of said stator and configured to rotate relative to said stator around an axis extending along said longitudinal direction,
a plurality of circumferentially spaced cooling fins arranged on said outer surface of the housing, each cooling fin extending along said longitudinal direction and projecting outwardly from said outer surface between a base portion located on said outer surface and a free end located at a fin distance, said fin distance being measured as radial distance between said axis and said free end,
said rotor comprises a plurality of inner air ducts, each inner air duct being configured to allow passage of an airflow therethrough,
said induction motor comprises a plurality of outer air ducts in fluid communication with said plurality of inner air ducts to form an air-circulation circuit,
each outer air duct is arranged adjacent to respective one or more cooling fins and is spaced apart and separated from said respective one or more cooling fins,
each outer air duct extends along said longitudinal direction, parallel to the respective one or more cooling fins, between a first end portion and second end portion, and
wherein each outer air duct is arranged outside said adjacent one or more cooling fins and exhibits a minimum duct distance measured as the minimum radial distance between said axis and said outer air duct, said minimum duct distance being greater than the maximum fin distance of the respective adjacent one or more cooling fins.

2. The induction motor according to claim 1, wherein:
each outer air duct is arranged radially outside the free end of a respective adjacent cooling fin and extends parallel to said adjacent cooling fin, and
said minimum duct distance being greater than the fin distance of said adjacent cooling fin.

3. The induction motor according to claim 1, wherein:
said housing comprises a plurality of first holes and a plurality of second holes formed in said outer surface, and
a plurality of first outer connection ducts and a plurality of second outer connection ducts are provided for connecting the first end portion of each outer air duct with a corresponding first hole, and for connecting the second end portion of each outer air duct with a corresponding second hole.

4. The induction motor according to claim 1, wherein:
said housing extends between a drive side and a fan side,
at said fan side, a fan cooling assembly is arranged,
said fan cooling assembly comprises an inner fan and an outer fan,
said inner fan is configured to generate an airflow flowing through said plurality of inner air ducts and said plurality of outer air ducts, and
said outer fan is configured to generate and direct an airflow towards said plurality of cooling fins arranged on the outer surface of the housing and towards said plurality of outer air ducts.

5. The induction motor according to claim 4, wherein:
said housing comprises a plurality of first holes and a plurality of second holes formed in said outer surface,
said inner fan comprises an inlet for sucking air and an outlet for discharging air, and
said outlet of the inner fan is positioned in proximity of one of said first and second holes.

6. The induction motor according to claim 5, wherein:
an inner air guide is positioned between the plurality of inner air ducts and the inner fan to collect and guide the air exiting the inner air ducts towards the inner fan, and
an inner air guide is positioned between the plurality of inner air ducts and the first holes to collect the air exiting the first holes and guide it towards said plurality of inner air ducts.

7. The induction motor according to claim 1, wherein a casing is arranged outside the plurality of cooling fins and said plurality of outer air ducts so that the cooling fins and the outer air ducts are enclosed between the outer surface of the housing and the casing.

8. The induction motor according to claim 1, wherein:
said rotor is coupled with a drive shaft,
said plurality of inner air ducts comprises one or more groups of circumferentially spaced inner air ducts, and
at least one group of circumferentially spaced inner air ducts is formed in said rotor at a radial position close to said drive shaft.

9. The induction motor according to claim 8, wherein:
said rotor comprises a rotor stack coupled with said drive shaft and a rotor cage coupled with said rotor stack, and
said at least one group of circumferentially spaced inner air ducts formed in said rotor at a radial position close to said drive shaft is formed in said rotor stack.

10. The induction motor according to claim 3, wherein the housing extends between a drive side and a fan side,
wherein at the fan side, a fan cooling assembly is arranged,
wherein the fan cooling assembly comprises an inner fan and an outer fan,
wherein the inner fan comprises an inlet for sucking air and an outlet for discharging air, and
wherein the outlet of the inner fan is positioned in proximity of one of said first and second holes.

11. The induction motor according to claim 10, wherein an inner air guide is positioned between the plurality of inner air ducts and the inner fan to collect and guide the air exiting the inner air ducts towards the inner fan, and
wherein an inner air guide is positioned between the plurality of inner air ducts and the first holes to collect the air exiting the first holes and guide it towards said plurality of inner air ducts.

* * * * *